US012768476B2

(12) United States Patent
Dweib et al.

(10) Patent No.: US 12,768,476 B2
(45) Date of Patent: Oct. 20, 2026

(54) COMPOSITE PIPE

(71) Applicant: Saudi Arabian Oil Company, Dhahran (SA)

(72) Inventors: Mahmoud A. Dweib, Arlington, WA (US); Omar A. Aljallal, Dammam (SA); Haytham A. Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 405 days.

(21) Appl. No.: 18/500,787

(22) Filed: Nov. 2, 2023

(65) Prior Publication Data

US 2025/0146600 A1 May 8, 2025

(51) Int. Cl.

*F16L 9/14* (2006.01)
*F16L 9/10* (2006.01)
*F16L 23/024* (2006.01)

(52) U.S. Cl.

CPC ................. *F16L 9/14* (2013.01); *F16L 9/105* (2013.01); *F16L 23/024* (2013.01)

(58) Field of Classification Search

CPC ..... F16L 9/105; F16L 9/16; F16L 9/14; F16L 23/04; B29C 53/581
USPC ............... 285/290.1, 290.2, 290.3, 290.4, 55
See application file for complete search history.

(56) References Cited

U.S. PATENT DOCUMENTS 2,359,952 A * 10/1944 Welger .................... F16L 33/28 285/55
3,537,484 A 11/1970 McLarty
3,613,736 A * 10/1971 Kuwabara ............. B63B 22/023 285/239
4,366,842 A * 1/1983 Peavy ..................... F16L 33/28 138/109
4,407,528 A * 10/1983 Anthony ............... F16L 25/026 285/55
4,619,470 A * 10/1986 Overath .................. F16L 23/02 285/55
4,647,078 A * 3/1987 Lundy ..................... F16L 47/24 285/55

(Continued)

FOREIGN PATENT DOCUMENTS

DE 2031959 A1 1/1972
DE 3333522 A1 4/1985

(Continued)

OTHER PUBLICATIONS

Arhant, "Thermoplastic Composites for Underwater Applications" Central School of Nanges, Composite Materials and Construction, Dec. 2016, 25 pages (specifically Figure 4, p. 18).

(Continued)

*Primary Examiner* — David Bochna
(74) *Attorney, Agent, or Firm* — Fish & Richardson P.C.

(57) ABSTRACT

A composite pipe includes a hollow, cylindrical liner, a flange end attachment comprising a flange and a cylindrical main body with a bore extending therethrough within which an end portion of the liner is disposed, and a thermoset outer layer comprising resin-impregnated filaments. The filaments of the thermoset outer layer are in contact with and wound about at least a portion of an external surface of the liner and at least a portion of an external surface of the cylindrical main body of the flange end attachment.

18 Claims, 5 Drawing Sheets

(56) References Cited

U.S. PATENT DOCUMENTS

| | | | | |
|---|---|---|---|---|
| 4,702,498 | A * | 10/1987 | Mueller | F16L 47/14<br>285/55 |
| 6,361,080 | B1 * | 3/2002 | Walsh | F16L 47/14<br>285/55 |
| 6,372,078 | B1 | 4/2002 | Melchert et al. | |
| 8,074,686 | B2 * | 12/2011 | Wolfram | E04G 21/04<br>138/146 |
| 8,322,382 | B2 | 12/2012 | Slagsvold et al. | |
| 8,685,514 | B2 | 4/2014 | Jeruzal et al. | |
| 9,353,893 | B2 | 5/2016 | Ruby et al. | |
| 11,009,172 | B2 | 5/2021 | Weisenberg | |
| 2016/0319970 | A1 * | 11/2016 | Cloos | F16L 23/006 |
| 2023/0130880 | A1 | 4/2023 | Fakiri et al. | |

FOREIGN PATENT DOCUMENTS

| | | |
|---|---|---|
| EP | 2862700 | 4/2019 |
| GB | 2146721 B | 2/1987 |

OTHER PUBLICATIONS

Deng et al., “Processing and Mechanical Properties of Basalt-Fibre-Reinforced Thermoplastic Composites,” Polymers, Mar. 2022, 14(6): 1220, 16 pages.

Karim et al., “An assessment of the processing parameters and application of fibre-reinforced polymers (FRPs) in the petroleum and natural gas industries: A review,” Results in Engineering, Jun. 2023, 18:101091, 20 pages, (specifically Figure 18, p. 12).

Mazur et al., “Green high-density polyethylene (HDPE) reinforced with basalt fiber and agricultural fillers for technical applications,” Composites Part B: Engineering, Dec. 2020, 202:108399, 10 pages.

Parvez et al., “Saudi Aramco details nonmetallic products deployment in oil, gas,” Oil & Gas Journal, Jan. 1, 2018, 51-60, 10 pages.

International Search Report and Written Opinion in International Appln. No. PCT/US2024/053581, mailed on Jan. 20, 2025, 15 pages.

* cited by examiner

COMPOSITE PIPE

TECHNICAL FIELD

The present disclosure relates composite pipe for use as a conveyance for fluids.

BACKGROUND

Composite pipe of great strength can be constructed of a thermoset resin. Those high performance, high volume fraction composites can be manufactured using many processes, including as resin transfer molding, filament winding, and pultrusion. Filament winding is a process in which filaments (of, for example, glass or carbon) are impregnated with resin by passing through a bath as they are wound onto a rotating cylinder, Once the cylinder is completely covered to the desired thickness, the resin is cured.

SUMMARY

Certain aspects of the subject matter herein can be implemented as a composite pipe that includes a hollow, cylindrical liner, a flange end attachment comprising a flange and a cylindrical main body with a bore extending therethrough within which an end portion of the liner is disposed, and a thermoset outer layer comprising resin-impregnated filaments. The filaments of the thermoset outer layer are in contact with and wound about at least a portion of an external surface of the liner and at least a portion of an external surface of the cylindrical main body of the flange end attachment.

Certain aspects of the subject matter herein can be implemented as a method. The method includes introducing a hollow, cylindrical liner, disposing an end portion of the liner into a bore of a cylindrical main body of a flange end attachment, and winding resin-impregnated filaments about at least a portion of the liner and of the flange end attachment such that the filaments of the thermoset outer layer are in contact with and wound about at least a portion of an external surface of the liner and at least a portion of an external surface of the cylindrical main body of the flange end attachment.

The details of one or more embodiments are set forth in the accompanying drawings and the description below. Other features, objects, and advantages will be apparent from the description and drawings, and from the claims.

DETAILED DESCRIPTION

Pipes comprising thermosetting resin can be relatively easy to mold and reinforce with a very high fiber volume fraction. However, thermosetting resin is brittle and can sustain microcracks as a result of relatively small loads, low speed impact, or flexing of the pipe under its own weight during handling. Microcracks in the resin matrix can form due to the exothermic resin curing as the composite part heats up then cools causing resin matrix to sustain some microcracks. Such microcracks can be problematic if fluid is conveyed through the pipe is at high pressure or high temperature. Pressure pushes the fluid into those microcracks widening and propagating them leading to leaks and complete rupture or failure of the structural body of the pipe. Microcracks and structural failure can also be caused by mechanical impact or unintending bending of the pipe during handling and transportation.

In some embodiments of the present disclosure, a composite pipe comprises a hollow, cylindrical liner and a flange end attachment comprising a flange and a cylindrical main body with a bore extending therethrough within which an end portion of the liner is disposed. A thermoset outer layer comprising resin-impregnated filaments are wound about at least a portion of an external surface of the liner at least a portion of an external surface of the cylindrical main body of the flange end attachment.

The presence of a liner inside the composite pipe can shield the fluid from interfacing with the resin, reducing the possibility of failure due to the presence of microcracks that were sustained by mechanical impact or unintending bending of the pipe during handling and transportation. Furthermore, by having the outer resin-impregnated filament cover encompass the outer surfaces of both the liner and the flange end attachments, structural strength can be increased. In some embodiments, the flange end attachments can include one or more rings to provide additional mechanical attachment. By having the flanges attached as separate components covered by the resin-impregnated filaments and reducing or eliminating the need for a threaded or other complicated connection between the liner and the flanges, the liners can be constructed using a simple, cost effective extrusion process without sacrificing structural integrity of the composite pipe.

Figure 1A:
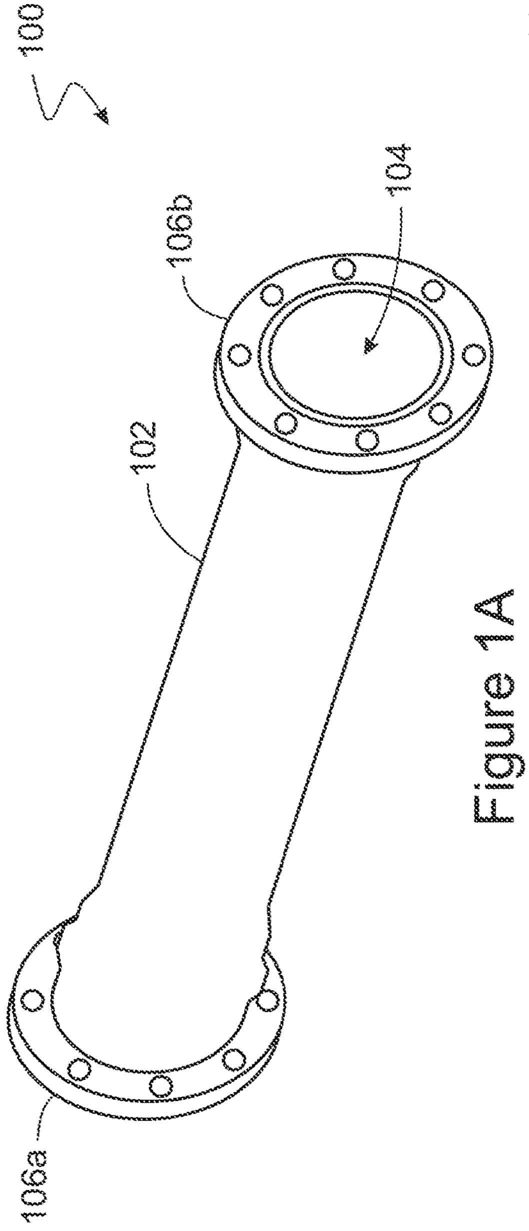
FIGS. 1A-1C are schematic illustrations of a composite pipe in accordance with embodiments of the present disclosure.
Figure 1B:
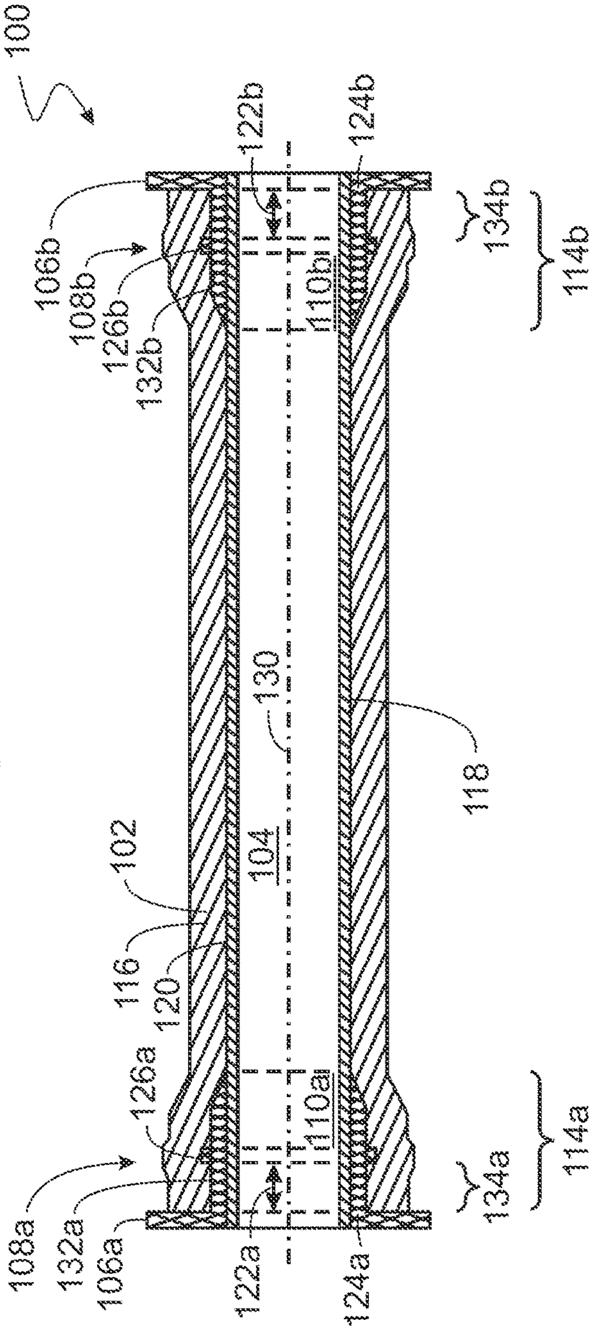

Referring to FIGS. 1A and 1*i*, composite pipe 100 comprises a thermoset outer layer 102 and a central bore 104. Thermoset outer layer 102 can in some embodiments comprise resin-impregnated filaments and, as shown in the cross-sectional view of FIG. 1B, is disposed about an internal liner 120. Liner 120 can in some embodiments be comprised of an extruded thermoplastic polymer such as polyethylene including 3%-5% of basalt nanoscale powder (nanoscale powder). In other embodiments the liner can be constructed of other suitable materials.

Flanges 106*a* and 106*b* radially protrude at the respective ends of composite pipe 100. Flanges 106*a* and 106*b* are, in turn, components (or elements) of flange end attachments 108*a* and 108*b*, respectively. In addition to flanges 106*a* and 106*b*, flange end attachments 108*a* and 108*b* comprise cylindrical main bodies 124*a* and 124*b* with bores 110*a* and 110*b*, respectively, extending therethrough. As shown in FIG. 1B, end portions 114*a* and 114*b* of the liner 120 are disposed within bores 110*a* and 110*b* of flange end attachments 108*a* and 108*b*. In some embodiments, flange end attachments 108*a* and 108*b* can be formed from a fiber-reinforced composite, steel or other metal, or another suitable material. In some embodiments, one or both of flanged end attachments 108*a* and 108*b* are one-piece flanged cylinders comprising the flange and the cylindrical main body. In some embodiments, one or both of flanged end attachments 108*a* and 108*b* are flange and the cylindrical main body are separate components. In the illustrated embodiment, bores 110*a* and 110*b* share a common central axis with liner 120, thus defining the central axis 130 of composite pipe 100.

Figure 1C:
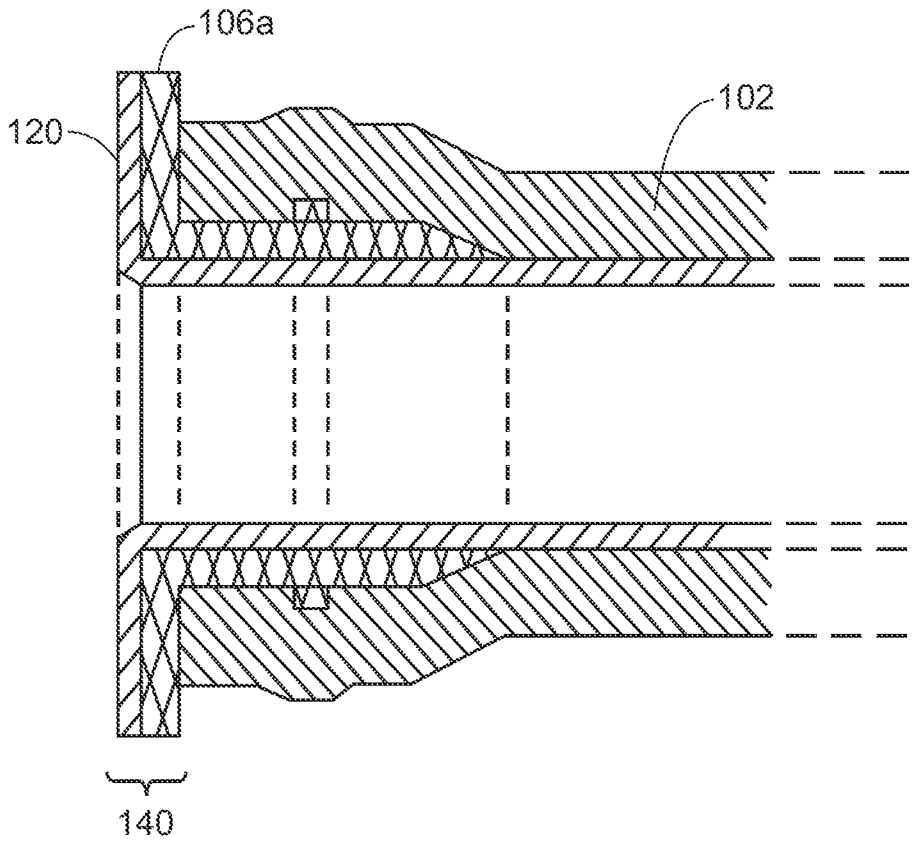

In the illustrated embodiment, liner 120 is inserted fully into the flange end attachments, such that the axial lengths of end portions 114*a* and 114*b* (that is, the portions of the liner inserted into the central bore of the flange end attachments) are substantially equal to the axial lengths of cylindrical main bodies 124*a* and 124*b*. Such full insertion can in some embodiments can enhance the structural integrity and strength of composite pipe 100. As shown in FIG. 1C, in some embodiments, liner 120 is inserted past the flange end attachments and then flared out (for example, by shaping the liner after the application of heat to soften the thermoplastic), such that a composite flange 140 comprises flange 106*a* plus the flared portion of liner 120. In some embodiments, one or both ends of liner 120 are inserted only partially into the flange end attachments.

While the embodiment illustrated in FIGS. 1A and 1B comprise flange end attachments (108*a* and 108*b*) at both ends, it will be understood that in some embodiments the composite pipe can include flanges and/or flange end attachments at only one end (for example, only flange end attachment 108*a*). In some embodiments, neither end of the composite pipe includes a flange and/or a flange end attachment.

Outer layer 102 can be composed of resin-impregnated filaments 116 of carbon or glass applied using a filament winding process, as described in greater detail below. In the illustrated embodiments, filaments 116 are applied such that the filaments of the thermoset outer layer are in contact with and wound about both an external surface 118 of liner 120 and external surfaces 132*a* and 132*b* of cylindrical main bodies 124*a* and 124*b*, respectively. By having the filaments wound about (and in contact with) external surfaces 132*a* and 132*b* of cylindrical main bodies 124*a* and 124*b* and also external surface 118 of liner 120, the components are embedded together within the filaments, and the filaments can act to lock the components together to provide structural strength and support to the composite pipe as a whole.

In some embodiment, outer layer 102 extends only a portion of the axial length between flanges 106*a* and 106*b*. However, in some embodiments including that illustrated in FIGS. 1A and 1, structural strength and integrity of pipe 100 can be enhanced by having the outer layer 102 extend as a cohesive layer fully covering the external surfaces from flange 106*a* to 106*b*, including around the external surfaces of cylindrical main bodies 124*a* and 124*b* of flange end attachments 108*a* and 108*b*. Structural strength can be further enhanced by preventing or limiting axial movement of the flange end attachments along the liner. To prevent such movement, the components can be manufactured with a close tolerance for a tight fit (for example, an interference fit) between the liner and the flange end attachments, and/or the components connected with a threaded or welded connection. Likewise, glue or other adhesive can be applied to liner 120 to prevent such axial movement of the flange end attachments. Alternatively or in addition, as shown in the illustrated embodiment, axial movement is reduced or eliminated by the inclusion of protruding rings 126*a* and 126*b* on the flange end attachments. Rings 126*a* and 126*b* can form part of the outer surface of the flange end attachments around which the filaments 116 are wound, thus enhancing the mechanical attachment of the flange end attachments together with the liner and the outer thermoset layer. In some embodiments, the rings are part of a one-piece flange end attachment. In some embodiments, the rings are separate components of a multi-piece flange end attachment.

In the illustrated embodiment, rings 126*a* and 126*b* are positioned axial distances 122*a* and 122*b* from flanges 106*a* and 106*b*, respectively. In the illustrated embodiment, the filaments 116 are in contact with, and wound about, the entire surfaces 132*a* and 132*b* of the cylindrical main bodies and surface 118 of the liner, including the those portions 134*a* and 134*b* between the rings 126*a* and 128*b* and flanges 106*a* and 106*b* (corresponding to distances 122*a* and 122*b*). The length of the axial distances 122*a* or 122*b* can be chosen so as to maximize the mechanical attachment of the filaments and the structural strength of pipe 100. In the illustrated embodiments, the axial distances 122*a* and 122*b* are approximately one half of the axial lengths of external surfaces 132*a* and 132*b*. In some embodiments, axial distances 122*a* and 122*b* can be a different relative distance from the flanges (for example, in some embodiments, one or more of axial distances 122*a* and 122*b* can be approximately one quarter, three quarters, or a different proportional length relative to the axial lengths of external surfaces 132*a* and 132*b*).

In some embodiments, outer layer 102 comprises the outer surface of composite pipe 100. In such embodiments, in other words, there is no sheath or other additional layer external of the filaments and resin of outer layer 102. Such a configuration can be suitable for application in which, for example, the composite pipe is a component of a buried, underground pipeline. In other embodiments, a sheath or outer covering covers outer layer 102. Such an outer cover can include, for example, a UV-resistant coating such as polyurethane or polyurea.

Figure 2:
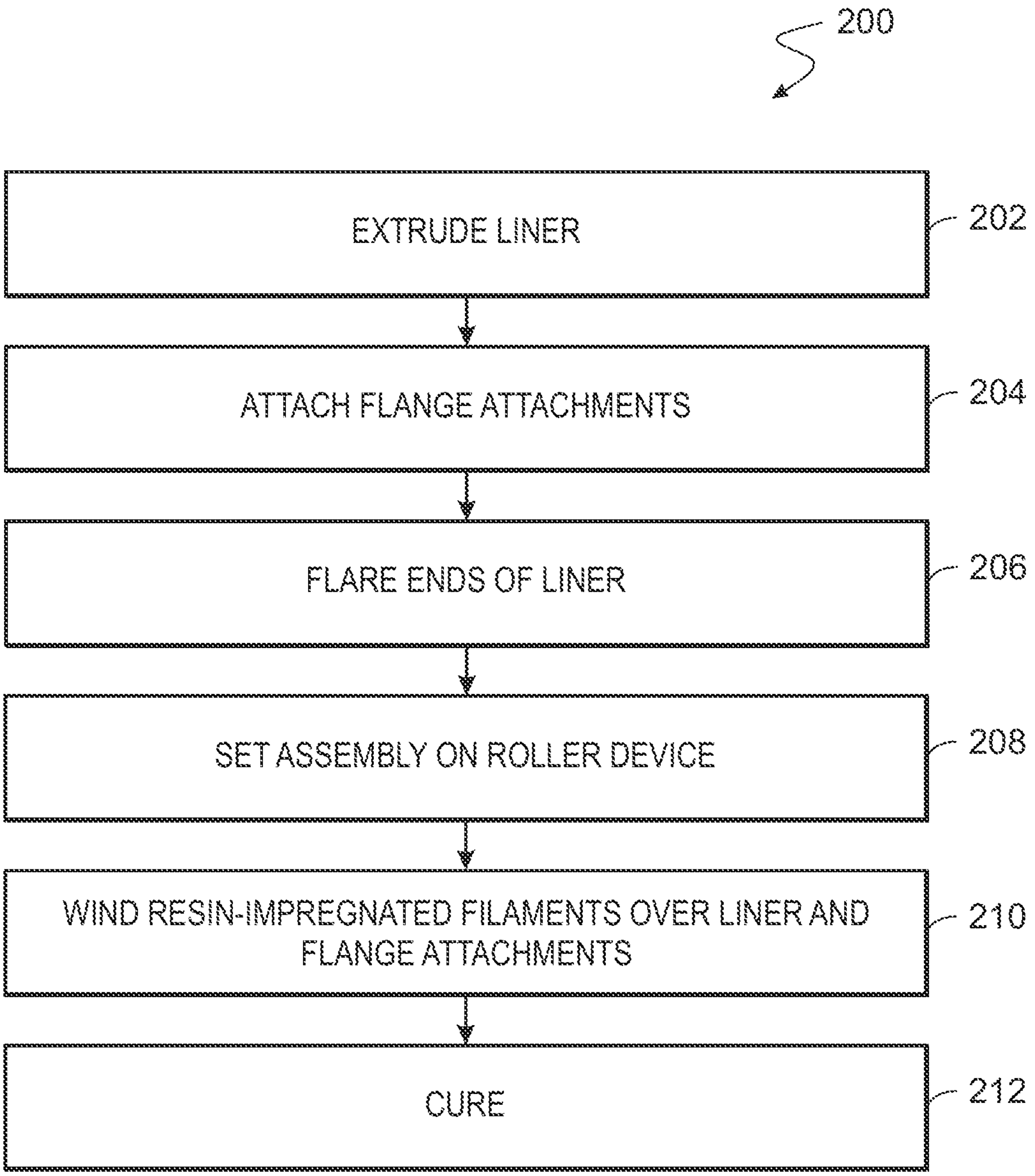
FIG. 2 is a process flow diagram of a method of making a composite pipe in accordance with embodiments of the present disclosure.

FIG. 2 describes a method 200 of forming a composite pipe in accordance with an embodiment of the present disclosure. Method 200 is herein described in reference to the components described in reference to FIGS. 1A and 1, but should not be interpreted as being limited to said components.

Method 200 begins at step 202 in which liner 120 is introduced. Liner 120 can be manufactured, for example, using a thin wall thermoplastic pipe using extrusion process can be comprised of, for example, polyethylene. To reduce porosity, provide stiffness, and improve resistance of polyethylene to fluid diffusion, 3%-5% of a nanoscale basalt powder can be mixed with thermoplastic.

Figure 3:
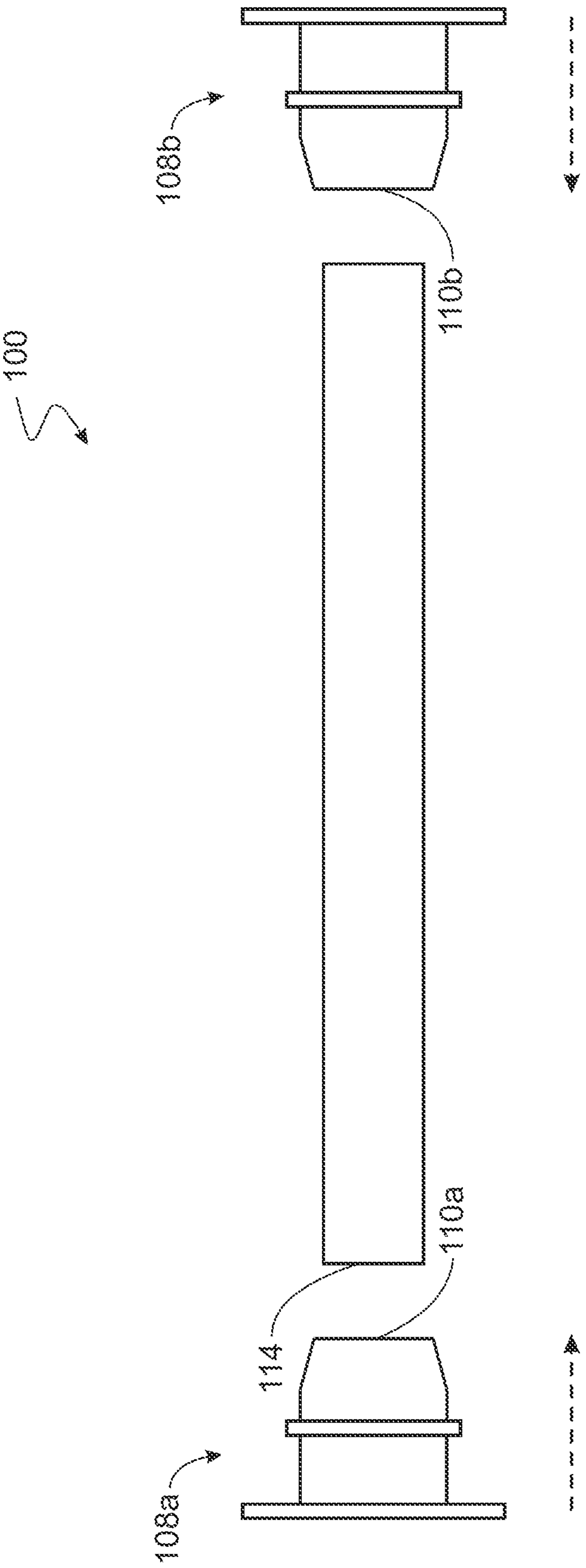
FIG. 3 is a schematic illustration of attachment of a flange end attachment to a liner of a composite pipe in accordance with embodiments of the present disclosure.

Proceeding to step 204, and as shown in FIG. 3, a first end portion 114*a* of the liner 120 is disposed (inserted into) bore 112*a* of flange end attachment 108*a*, and second end portion 114*b* of liner 120 is disposed (inserted into) bore 112*b* of flange end attachment 108*b*. In some embodiments, a glue or adhesive is applied to secure the flange end attachments to the liner, prior to filament winding. At step 206, in some embodiments, the ends of liner 120 can be flared out (as shown in FIG. 1C).

Figure 4:
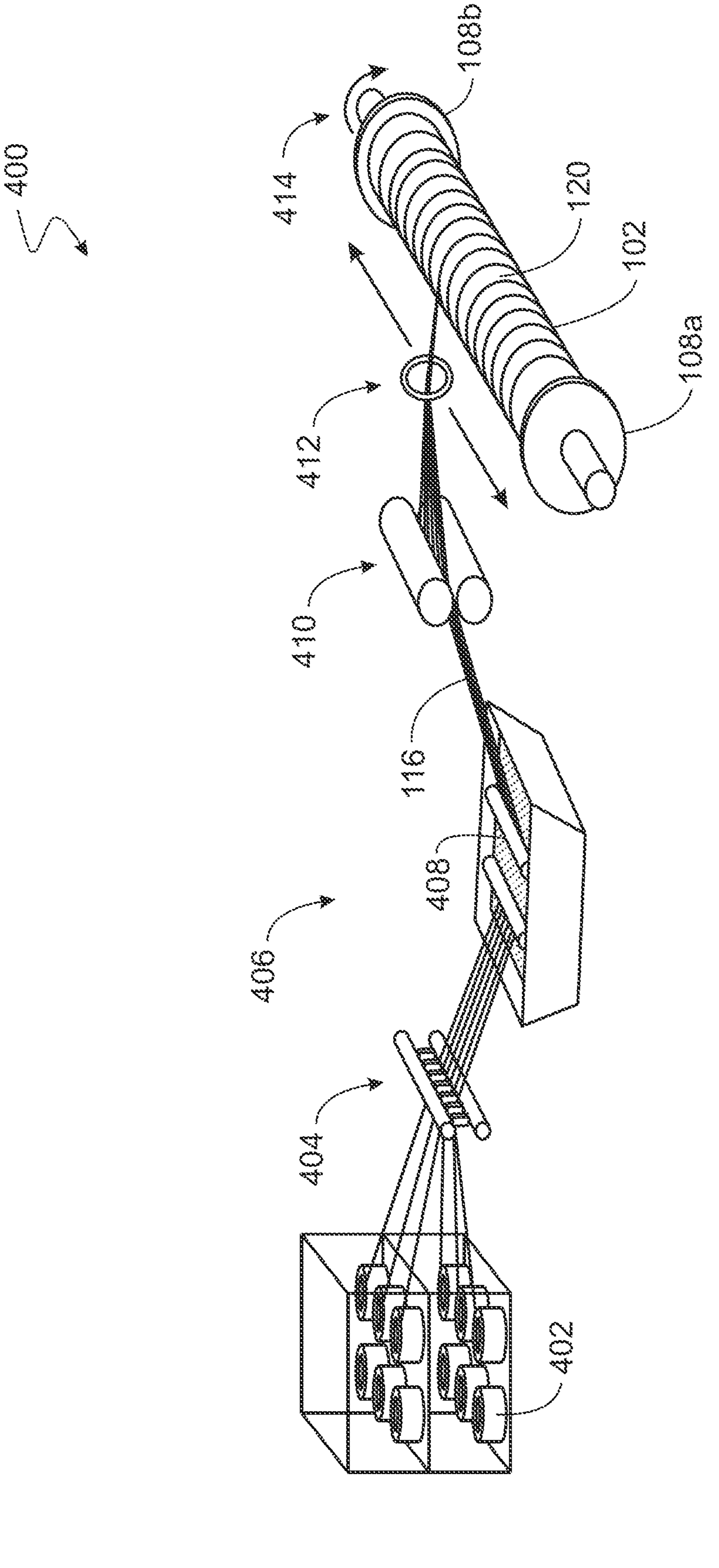
FIG. 4 is a schematic illustration of a filament winding process in accordance with embodiments of the present disclosure.

Proceeding to step 208, and as shown in FIG. 4, liner 120 with the flange end attachments 108*a* and 108*b* can be installed on a filament winding apparatus 400. Filament winding apparatus 400 can include filament creel 402 from which filaments 116 are drawn, separator combs 404, resin bath 406 with an resin 408 (which can be, for example, an epoxy or vinyl resin), nip rollers 410, and carriage guide 412, and rolling mechanism 414 onto which the liner 120 with the flange end attachments 108*a* and 108*b* can be installed. In some embodiments, rolling mechanism 414 includes a mandrel over which liner 120 is installed, and the liner is removed from the mandrel after filament winding. In other embodiments, no separate mandrel is used (i.e., rolling mechanism 414 is comprised of rotating end connections to which flange end attachments 108*a* and 108*b* are attached, such that the liner (with the flange end attachments) itself acts as the entire rotating mandrel)). In such embodiments, to give liner 120 additional stiffness during filament winding and not flex or bend, a small amount of pressure can be applied inside the pipe after sealing the ends where the winding motor two ends attach and grab the pipe. A suitable pressure can be, for example, 5 psi or suitable another pressure value based on the mechanical properties of the liner, to prevent damage to the liner.

Proceeding to step 210, filament winding apparatus 400 is engaged, such that filaments 116 are drawn from creel 402 and are impregnated with resin 408 from resin bath 405, and wound about liner 120 and flange end attachments 108*a* and 108*b* as the assembly rotates, thus forming the outer layer 102. When the outer 102 layer is complete, the pipe can be removed from apparatus 400 and, at step 212, the resin allowed to cure.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

EXAMPLES

In a first aspect, a composite pipe includes a hollow, cylindrical liner, a flange end attachment comprising a flange and a cylindrical main body with a bore extending therethrough within which an end portion of the liner is disposed, and a thermoset outer layer comprising resin-impregnated filaments. The filaments of the thermoset outer layer are in contact with and wound about at least a portion of an external surface of the liner and at least a portion of an external surface of the cylindrical main body of the flange end attachment.

In a second aspect in accordance with the first aspect, the external surface of the cylindrical main body of the flange end attachment can comprise a protruding ring an axial distance from the flange, wherein the filaments of the thermoset outer layer are in contact with and wound about at least a portion of the external surface of the cylindrical main body between the ring and the flange.

In a third aspect in accordance with the first or the second aspect, the axial distance can be approximately half the distance between the flange and the portion of the external surface of the cylindrical main body between the ring and the external surface of the liner in contact with the filaments.

In a fourth aspect in accordance with any of the first to third aspects, the flanged end attachment can be a one-piece flanged cylinder comprising the flange and the cylindrical main body.

In a fifth aspect in accordance with any of the first to fourth aspects, the flange and the cylindrical main body can be separate components of the flanged end attachment.

In a sixth aspect in accordance with any of the first to fifth aspects, the liner can comprise extruded polyethylene.

In a seventh aspect in accordance with any of the first to sixth aspects, the liner can comprise 3-5% of nano-scale basalt powder.

In an eighth aspect in accordance with any of the first to seventh aspects, the liner can extent outward past the flange end attachment and is flared.

In a ninth aspect in accordance with any of the first to eighth aspects, the flange end attachment can be adhered to the liner by an adhesive.

In a tenth aspect in accordance with any of the first to ninth aspects, the filaments can comprise glass or carbon filaments.

In an eleventh aspect, a method comprises introducing a hollow, cylindrical liner, disposing an end portion of the liner into a bore of a cylindrical main body of a flange end attachment, and winding resin-impregnated filaments about at least a portion of the liner and of the flange end attachment such that the filaments of the thermoset outer layer are in contact with and wound about at least a portion of an external surface of the liner and at least a portion of an external surface of the cylindrical main body of the flange end attachment.

In a twelfth aspect in accordance with the eleventh aspect, the external surface of the cylindrical main body of the flange end attachment can comprise a protruding ring an axial distance from the flange, wherein the filaments of the thermoset outer layer are in contact with and wound about at least a portion of the external surface of the cylindrical main body between the ring and the flange.

In a thirteenth aspect in accordance with the eleventh or the twelfth aspect, the axial distance can be approximately half the distance between the flange and the portion of the external surface of the cylindrical main body between the ring and the external surface of the liner in contact with the filaments.

In a fourteenth aspect in accordance any of the eleventh to thirteenth aspects, the flanged end attachment can be a one-piece flanged cylinder comprising the flange and the cylindrical main body.

In a fifteenth aspect in accordance with any of the eleventh to fourteenth aspects, the flange and the cylindrical main body can be separate components of the flanged end attachment.

In a sixteenth aspect in accordance with any of the eleventh to fifteenth aspects, the liner can comprise extruded polyethylene.

In a seventeenth aspect in accordance with any of the eleventh to sixteenth aspects, the liner can comprise 3-5% of nano-scale basalt powder.

In an eighteenth aspect in accordance with any of the eleventh to seventeenth aspects, disposing the end portion can comprise disposing the end portion such that the liner extents outward past the flange end attachment, and further comprising then flaring a portion of the liner.

In a nineteenth aspect in accordance with any of the eleventh to eighteenth aspects, the method can further include adhering the flange end attachment to the liner with an adhesive.

In a twentieth aspect in accordance with any of the eleventh to nineteenth aspects, the filaments can comprise glass or carbon filaments.

What is claimed is:

1. A composite pipe comprising:
- a hollow, cylindrical liner comprising 3-5% of nano-scale basalt powder;
- a flange end attachment comprising a flange and a cylindrical main body with a bore extending therethrough within which an end portion of the liner is disposed; and
- a thermoset outer layer comprising resin-impregnated filaments, wherein filaments of the thermoset outer layer are in contact with and wound about:
  - at least a portion of an external surface of the liner; and
  - at least a portion of an external surface of the cylindrical main body of the flange end attachment.

2. The composite pipe of claim 1, wherein the external surface of the cylindrical main body of the flange end attachment comprises a protruding ring an axial distance from the flange, wherein the filaments of the thermoset outer layer are in contact with and wound about at least a portion of the external surface of the cylindrical main body between the ring and the flange.

3. The composite pipe of claim 2, wherein the axial distance is approximately half the distance between the flange and the portion of the external surface of the cylindrical main body between the ring and the external surface of the liner in contact with the filaments.

4. The composite pipe of claim 1, wherein the flanged end attachment is a one-piece flanged cylinder comprising the flange and the cylindrical main body.

5. The composite pipe of claim 1, wherein the flange and the cylindrical main body are separate components of the flanged end attachment.

6. The composite pipe of claim 1, wherein the liner comprises extruded polyethylene.

7. The composite pipe of claim 1, wherein the liner extents outward past the flange end attachment and is flared.

8. The composite pipe of claim 1, wherein the flange end attachment is adhered to the liner by an adhesive.

9. The composite pipe of claim 1, wherein the filaments comprise glass or carbon filaments.

10. A method comprising:
- introducing a hollow, cylindrical liner comprising 3-5% of nano-scale basalt powder;
- disposing an end portion of the liner into a bore of a cylindrical main body of a flange end attachment; and
- winding resin-impregnated filaments about at least a portion of the liner and of the flange end attachment such that the filaments of the thermoset outer layer are in contact with and wound about:
  - at least a portion of an external surface of the liner; and
  - at least a portion of an external surface of the cylindrical main body of the flange end attachment.

11. The method of claim 10, wherein the external surface of the cylindrical main body of the flange end attachment comprises a protruding ring an axial distance from the flange, and wherein winding the filaments comprises winding the filaments such that the filaments of the thermoset outer layer are in contact with and wound about at least a portion of the external surface of the cylindrical main body between the ring and the flange.

12. The method of claim 11, wherein the axial distance is approximately half the distance between the flange and the portion of the external surface of the cylindrical main body between the ring and the external surface of the liner in contact with the filaments.

13. The method of claim 10, wherein the flanged end attachment is a one-piece flanged cylinder comprising the flange and the cylindrical main body.

14. The method of claim 10, wherein the flange and the cylindrical main body are separate components of the flanged end attachment.

15. The method of claim 10, wherein the liner comprises extruded polyethylene.

16. The method of claim 10, wherein disposing the end portion comprises disposing the end portion such that the liner extents outward past the flange end attachment, and further comprising then flaring a portion of the liner.

17. The method of claim 10, further comprising adhering the flange end attachment to the liner with an adhesive.

18. The method of claim 10, wherein the filaments comprise glass or carbon filaments.

* * * * *